3,793,343
5-AMINO-3,5-DIPHENYL-3-PYRROLIN-2-ONES

Laurence I. Peterson, Framingham, Mass., assignor to The Dow Chemical Company, Midland, Mich.
No Drawing. Original application Jan. 6, 1969, Ser. No. 789,378, now Patent No. 3,679,671. Divided and this application May 18, 1972, Ser. No. 254,654
Int. Cl. C07d 27/16
U.S. Cl. 260—326.5 FL                2 Claims

ABSTRACT OF THE DISCLOSURE

A new method of oxidizing various phenylacetonitrile derivatives employing a copper (II)-amine catalyst system; and the new 3-(amine substituted)-2-phenylacrylonitriles and 5-substituted derivatives of 3,5-diphenyl-3-pyrrolin-2-one prepared by this new method.

---

This is a division of application Ser. No. 789,378, filed Jan. 6, 1969, now U.S. Patent No. 3,679,671.

BACKGROUND OF THE INVENTION

The present invention is directed to a method of oxidizing various phenylacetonitrile derivatives. The new method utilizes a copper (II)-amine catalyst system with the oxidation being carried out under mild temperature and pressure conditions. Furthermore, the copper (II)-amine catalyst system catalyzes the highly specific oxidation of the starting materials to produce large yields of the desired product without attendant tar production. The copper (II)-amine catalyst system utilized in the method of the present invention is soluble in many common organic solvents thus producing a homogeneous reaction system.

Further, when employing the method of the present invention, 2,3-diphenylsuccinonitrile is oxidized (dehydrogenated) to 2,3-diphenylfumaronitrile (yield greater than 70%). Since the precursor 2,3-diphenylsuccinonitrile is conveniently prepared by the condensation of benzaldehyde with phenylacetonitrile in the presence of cyanide ion, the production of 2,3-diphenylfumaronitrile from benzaldehyde and phenylacetonitrile can now be carried out much more efficiently than formerly possible. This new, highly efficient pathway to diphenylfumaronitrile, through the dehydrogenation of 2,3-diphenylsuccinonitrile, is significant, particularly in view of the statement by Coe et al., J. Chem. Soc., 1957, 123, "Dehydrogenation of Diphenylsuccinonitrile Was Not a Practical Approach to Dicyanostilbene." The previous attempts to dehydrogenate diphenylsuccinonitrile resulted in low yields and large amounts of tar formation.

It is, therefore, readily apparent that the method of the present invention provides a highly specific method of oxidizing phenylacetonitrile derivatives under mild reaction conditions. Furthermore, the method of the present invention provides a new high yield synthesis for preparing new 3-(amine substituted)-2-phenylacrylonitriles and 5-(amine substituted)-3,5-diphenyl-3-pyrrolin-2-ones.

SUMMARY OF THE INVENTION

The oxidation method of the present invention comprises reacting a phenylacetonitrile derivative with a copper (II)-amine catalyst system in a liquid reaction mixture. The oxidation takes place in an excess of a primary or secondary amine as reaction medium or in an inert organic solvent as reaction medium. The oxidation of the phenylacetonitrile derivatives is carried out at temperatures of between from —40° to 150° C. with temperatures between 20° and 80° C. being preferred.

The phenylacetonitrile derivatives employed as starting materials in the oxidation method of the present invention correspond to the following formula:

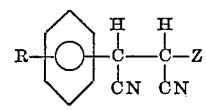

In the present specification and claims, R represents hydrogen, alkyl, phenyl, halo, cyano, nitro, lower alkoxy or lower thioalkyl and Z represents hydrogen, phenyl, substituted phenyl, benzoyl, or substituted benzoyl. As employed in the present specification and claims, "alkyl" refers to alkyl moieties having from 1 to 8 carbon atoms, inclusive; "halo" represents chlorine, bromine, fluorine or iodine; "lower thioalkyl" and "lower alkoxy" designate thioalkyl or alkoxy moieties having from 1 to 4 carbon atoms, inclusive; "substituted phenyl" designates a phenyl moiety bearing a substituent selected from the group defined by R and the term "substituted benzoyl" designates methylbenzoyl, halobenzoyl or nitrobenzoyl.

The copper (II)-amine catalyst system is a coordination complex formed by the cupric ion ($Cu^{++}$) and a primary or secondary amine. The copper (II) component of the copper (II)-amine catalyst system is provided by elemental copper or by any copper salt wherein the copper ion is capable of assuming the copper (II) state and wherein the coordination between the copper (II) and the ligand or chelating agent is weak enough to allow the copper (II) to be reduced to copper (I). Thus, in addition to elemental copper and cupric salts, the copper (II) component of the copper (II)-amine catalyst system can be supplied by adding cuprous salts to the reaction mixture provided the cuprous ion can be oxidized to the copper (II) state by molecular oxygen or other oxygenating species.

The copper component is added to the reaction mixture in an amount sufficient to provide a catalytic amount of copper (II). In general, a catalytic amount of copper (II) is considered to be from about 1 to about 5 mole percent with respect to the phenylacetonitrile derivative. The amount of elemental copper or copper salt to be added to the reaction mixture in order to provide the catalytic amount of copper (II) will depend upon how much of the copper (I) produced as a result of the oxidation of the phenylacetonitrile derivatives can be air oxidized back to the copper (II) state. If no molecular oxygen or other oxidizing species is available in the reaction system to regenerate the copper (II), then the copper component will have to be added to the reaction mixture as a copper (II) containing species, i.e., a cupric salt, and in an amount sufficient to provide a substantially stoichiometric amount of copper (II). However, in those cases where the reaction generates catalytic poisons such as ⁻CN, which prevent the regeneration of copper (II) by inhibiting the oxidation of copper (I) to copper (II), nearly stoichiometric amounts of copper are employed. The inhibiting effects of the ⁻CN ions are decreased by the addition of a ⁻CN scavenger such as ferric ion to the reaction mixture; when such a ⁻CN scavenger is employed, the amount of copper employed will range between a catalytic amount and a stoichiometric amount.

Representative copper salts include cupric acetate, cupric bromate, cupric bromide, cupric chlorate, cupric chloride, cupric fluoride, cupric formate, cupric nitrate, cupric phosphate, cupric sulfate, cupric tartrate, cuprous bromide, cuprous chloride, cuprous benzoate, cuprous acetate, cupric nitrate pentahydrate, cupric stearate and the like.

The term "amine" as employed in the present specification and claims designates a primary or secondary amine corresponding to the formula

wherein Y represents lower alkyl or lower alkanol, and Y' represents hydrogen, lower alkyl, or lower hydroxyalkyl and when Y and Y' are alkyl moieties they can be combined to produce a heterocyclic ring, i.e., a hydrogen is removed from each alkyl moiety thereby producing alkylene moieties which are joined to produce a heterocyclic ring with nitrogen as the hetero atom. The terms "lower alkyl" and "lower hydroxyalkyl" as employed in the present specification and claims, designate alkyl or hydroxyalkyl moieties containing from 1 to 4 carbon atoms, inclusive. Representative lower alkyl and lower hydroxyalkyl moieties include methyl, ethyl, propyl, butyl, hydroxymethyl, hydroxyethyl, 2-hydroxypropyl, 3-hydroxypropyl and hydroxybutyl.

The primary or secondary amine is employed in an amount equivalent to at least twice the molar amount of copper employed. The use of the amine in amounts materially less than 2 molar proportions results in very slow oxidation of the phenylacetonitrile derivatives or in the formation of a heterogeneous reaction mixture. The cupric ion in its most favorable coordination state (square planar) prefers coordination to four amine ligands and it is, therefore, preferred that the amine be present in molar amounts equivalent to at least 4 times the amount of cupric ion. In a convenient procedure, the primary or secondary amine is employed in an amount equivalent to from 4 to 10 times greater than the theoretical maximum amount of cupric ion available, i.e., all copper in the copper (II) state. The use of the amine in amounts greater than 10 times the molar amount of cupric ion does not adversely affect the desired product or the yield obtained; however, such large excesses are generally uneconomical. Representative amines include aziridine, piperidine, dibutylamine, methylethylamine, methylbutylamine, diethylamine, propanolamine, ethanolamine, methylethanolamine, pyrrolidine and dipropylamine.

In carrying out the method of the present invention, the phenylacetonitrile derivative, copper and primary or secondary amine are contacted together in any order. The reaction is carried out in a liquid environment comprised of an excess of the primary or secondary amine or a mixture of the primary or secondary amine and an inert organic liquid. Representative organic liquids suitable as reaction media include benzene, methanol, dimethylformamide, dimethylsulfoxide, chlorobenzene, and n-hexane. It is convenient and generally preferred that the reaction mixture be agitated in order to increase the rate of contact of the reactants and to increase the air oxidative regeneration of the copper (II) ions. The agitation of the reaction mixture can be achieved by any convenient procedure such as stirring, bubbling oxygen or air through the reaction mixture and the like. Following the contacting of the reactants, the temperature of the reaction mixture is maintained within the reaction temperature range for from 10 minutes to 5 hours. The reaction is conveniently carried out under oxygen; however, the reaction can also be conveniently carried out under an inert atmosphere such as nitrogen provided the reaction mixture contains an oxygenating species. However, if it is desired to carry the reaction out under a non-oxygen containing atmosphere and in the absence of another oxygenating species, a substantially stoichiometric amount of copper (II) ions must be employed. Good yields of the desired product are obtained by conducting the reaction under atmospheric pressure (760 mm. of Hg). However, increasing the pressure above atmospheric pressure has a favorable effect on the rate of the reaction.

Following the reaction period, the desired product is isolated from the reaction mixture by conventional isolation procedures. In a convenient procedure, an inert organic solvent is added to the reaction mixture and the diluted mixture further diluted with water. Upon dilution with water, the mixture separated into an organic and an aqueous phase. The organic phase contains the product and the aqueous phase contains copper hydroxide which has formed during the dilution procedure. It is convenient to acidify the aqueous phase in order to dissolve the copper hydroxide before separating the organic and aqueous phases. The organic and aqueous phases are then separated and the organic phase is stripped in vacuo to remove the low boiling constituents and obtain the desired product as a solid residue.

The new 3-(amine substituted)-2-phenylacrylonitriles of the present invention correspond to the formula:

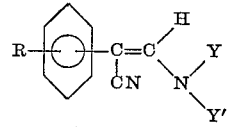

with R, Y and Y' being selected from the groups as previously defined. These new 3-(amine substituted)-2-phenylacrylonitriles are generally crystalline solids which are insoluble in water and are soluble in various common organic solvents such as benzene, diethylether and chloroform. The 3-(amine substituted)-2-phenylacrylonitriles are useful as pesticides for the kill and control of various pests such as fungi, bacteria, snails, trash fish, insects and terrestrial plants, including *Bacillus subtilis, Pullularia pullulans, Salmonella typhosa,* pigweeds, plum curculio, bindweeds and gold fish.

The new 3-(amine substituted)-2-phenylacrylonitrile compounds are prepared in accordance with the new method of the present invention. In said method, elemental copper or a copper salt as previously described and the amine are admixed with a phenylacetonitrile derivative corresponding to the formula:

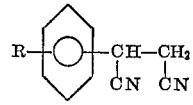

The phenylacetonitrile, amine and copper starting materials are dispersed in an inert organic liquid reaction media or in an excess of the amine as reaction medium. Nearly stoichiometric amounts of copper or copper salt are employed with respect to the phenylacetonitrile starting material. The use of such large amounts of copper salt is recommended because the catalytic poison, $^-CN$, is produced as a reaction by-product. As previously stated, this catalytic poison inhibits the reoxygenation of the copper (I) species to copper (II); thus a small amount of copper (II) will not be sufficient to catalyze the oxidation of the phenylacetonitrile starting material. However, if a $^-CN$ scavenger is employed, substantially less than a stoichiometric amount of copper or copper salt can be employed without adversely affecting the yield of the desired product. Following the contacting of the phenylacetonitrile derivative, amine and copper (II), the reaction is carried out in accordance with the method of the present invention with the 3-(amine substituted)-2-phenylacrylonitrile product being separated from the reaction mixture as previously described.

It is believed that the reaction proceeds in conformance with the following schematic representation.

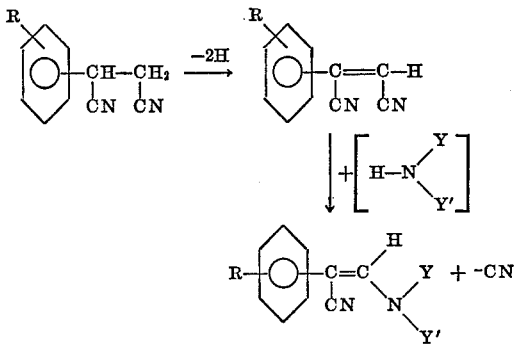

Representative 3-(amine substituted)-2-phenylacrylonitrile products include 2-(4-cyanophenyl)-3-diethylaminoacrylonitrile;
2-biphenyl-3-propylaminoacrylonitrile;
2-(3-methoxyphenyl)-3-dimethylaminoacrylonitrile;
2-(4-butoxyphenyl)-3-aziridinylacrylonitrile;
2-(4-propylthiophenyl)-3-azolidinylacrylonitrile;
2-(4-heptylphenyl)-3-di-n-butylaminoacrylonitrile;
2-phenyl-3-dihydroxyethylaminoacrylonitrile; and
2-(3,4-dichlorophenyl)-3-hydroxybutyl butylaminoacrylonitrile.

The other class of new compounds produced in accordance with the present invention is the 5-(amine substituted)-3,5-diphenyl-3-pyrrolin-2-ones corresponding to the formula:

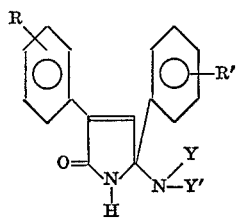

wherein R, Y and Y' are all selected from the group as previously defined. R' as employed in the present specification and claims represents methyl, halo and nitro. These new 5-(amine substituted)-3,5-diphenyl-3-pyrrolin-2-ones are crystalline solids and are insoluble in water and soluble in common organic solvents such as chlorobenzene, methylene chloride and acetone. The 5-(amine substituted)-3,5-diphenyl-3-pyrrolin-2-ones are useful as pesticides for the kill and control of various bacteria and fungi including lettuce, downy mildew, plum curculio, apple scab and tomato late blight.

The 5 - (amine substituted)-3,5-diphenyl-3-pyrrolin-2-one compounds are prepared by oxidizing a phenylacetonitrile derivative corresponding to the formula

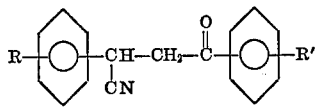

wherein R and R' are as previously defined. The phenylacetonitrile derivative and the copper are, as in the previous cases, dispersed with the amine in an inert organic solvent as reaction media or in an excess of the amine as reaction media. In view of the fact that no catalytic poison is generated during the production of the 5-(amine substituted)-3,5-diphenyl-3-pyrrolin - 2 - one product, the copper can be added in an amount sufficient to provide from about 1 to about 5 mole percent of copper (II), i.e., when all of the copper is in the copper (II) state, the amount of copper (II) will be equivalent to from about 1 to about 5 mole percent of the phenylacetonitrile starting material. The reaction is then carried out and the product is isolated in accordance with the methods previously described. The 5-(amine substituted)-3,5-diphenyl-3-pyrrolin-2-one product can then be employed in pesticidal applications or further purified by conventional purification techniques before being so employed. Representative 5-(amine substituted)-3,5-diphenyl-3-pyrrolin-2-ones include 5-(diethylamine)-3-(4-nitrophenyl)-5-phenyl-3-pyrrolin-2-one;
5-(methylhexylamine)-3-(2-chlorophenyl)-5-(4-iodophenyl)-3-pyrrolin-2-one;
5-(dipropylamine)-3-(3-butylphenyl)-5-phenyl-3-pyrrolin-2-one;
5-(azetidinyl)-3-(4-ethoxyphenyl)-5-phenyl-3-pyrrolin-2-one;
5-(azolidinyl)-3-(4-ethylthiophenyl)-5-phenyl-3-pyrrolin-2-one;
5-(dimethylamine)-3-(4-bromophenyl)-5-phenyl-3-pyrrolin-2-one;
5-(hexylamine)-3-(3-n-butylthiophenyl)-5-(4-fluorophenyl)-3-pyrrolin-2-one;
5-(diethylamine)-3,5-di(4-cyanophenyl)-3-pyrrolin-2-one;
5-(dipropylamine)-3,5-di(4-nitrophenyl)-3-pyrrolin-2-one;
5-(hydroxybutylethylamine)-3-(3-cyanophenyl)-5-phenyl-3-pyrrolin-2-one;
5-(dimethylamine)-3-biphenyl-5-(4-nitrophenyl)-3-pyrrolin-2-one;
5-piperidine-3-(4-butylphenyl)-5-(3-iodophenyl)-3-pyrrolin-2-one.

Furthermore, the new method of the present invention can be employed to oxidize 2,3-diphenylsuccinonitrile to 2,3-diphenylfumaronitrile. The quantities of starting materials and the reaction procedure are all as previously described.

SPECIFIC EMBODIMENTS

The following specific examples are illustrative of the present invention; however, they are not deemed to be limiting.

Example 1

A solution of α-phenyl-β-benzoylpropionitrile (4.7 g., 0.020 mole) in 15 milliliters of piperidine was injected with a syringe through a rubber septum into a sealed flask containing cuprous chloride (0.15 g., 0.0015 mole) in 10 milliliters of piperidine under oxygen at 760 mm. pressure. The reaction mixture was stirred and maintained at a temperature of 24.5° C. for two hours. During this two-hour period, stirring was continued for an additional 1¾ hours. During the entire 3.75-hour reaction period, 520 milliliters of oxygen were absorbed. The reaction mixture following the reaction period was poured into 200 milliliters of ice water. Upon pouring the reaction mixture into ice water, a yellow solid precipitated in the diluted mixture. This yellow solid precipitate was extracted into benzene and the benzene extraction liquid stripped under vacuum to give 5 grams of 5-piperidine-3,5-diphenyl-3-pyrrolin-2-one. This product upon recrystallization from benzene melted at 167° to 168° C. (yield 79%).

In further operations, α-phenyl-β-benzoylpropionitrile (0.5 mole), dimethylamine (4 moles) and cuprous chloride (0.25 mole) are reacted together at 0° C. and under oxygen at a pressure of 1500 mm. of mercury for a period of five hours to prepare the 5-(dimethylamine)-3,5-diphenyl-3-pyrrolin-2-one product. 5-(dimethylamine)-3,5-diphenyl-3-pyrrolin-2-one melts at 128° to 129.5° C.

In still further operations, α-phenyl-β-benzoylpropionitrile (235 g., 1 mole), aziridine (172 g., 4 moles) and cupric acetate (4 g., 0.02 mole) are dispersed in 200 milliliters of dimethylsulfoxide. The resulting reaction mixture is heated at 70° C. for one hour. Following the reaction period the reaction mixture is poured into ice water. The organic phase which forms during the dilution of the reaction mixture is separated and the low boiling constituents are removed by evaporation to obtain the 5-(1- aziridinyl)-3,5-diphenyl-3-pyrrolin - 2 - one product as a solid residue. 5-(1-aziridinyl)-3,5-diphenyl-3-pyrrolin-2-one melts at 166.5° to 167° C.

Example 2

A three-necked, 500-milliliter round bottom flask was charged with phenylsuccinonitrile (6.2 g., 0.040 mole) dissolved in 20 milliliters of methanol. The flask and contents were cooled to 5° C. at which time a solution of cupric acetate monohydrate (16.0 g., 0.080 mole) in 80 milliliters of piperidine and 80 milliliters of methanol was added over a 45-minute period. Following the addition of the cupric acetate monohydrate solution, the reaction mixture was allowed to warm to 10° C. and stirred for an additional 45 minutes. The reaction mixture and 800 milliliters of benzene were then added to 800 milliliters of ice and water whereupon the mixture separated into an aqueous phase and an organic phase. The organic phase was separated, dried and the benzene removed under vacuum at 50° C. to provide 6 grams (71% yield) of α-phenyl-1-piperidine-acrylonitrile product. This product upon recrystallization from 95% ethanol and then from a mixture of methanol and benzene was found to melt at 102.5° to 103° C.

In a further example, dimethylamine was substituted for piperidine to produce the 2-phenyl-3-dimethylaminoacrylonitrile product which upon recrystallization from methanol benzene (5:1) was found to melt at 79° to 80° C.

In further operations the following compounds are prepared in accordance with the method of the present invention:

α-Phenyl-1-aziridinylacrylonitrile (molecular weight 170.1) by reacting together phenylsuccinonitrile, cupric bromide and ethyleneimine under $N_2$ at 100° C. for one hour.

2 - (4 - bromophenyl) - 3 - (methylpropylamine) -acrylonitrile (molecular weight 279.1) by reacting 2-(4-bromophenyl)-succinonitrile and methylpropylamine with cuprous chloride as catalyst.

2 - (3 - octylphenyl) - 3 - hydroxybutylaminoacrylonitrile (molecular weight 327.4) by reacting 2-(3-octylphenyl)-succinonitrile and butanolamine with cupric nitrate pentahydrate as catalyst.

2-(4-ethoxyphenyl)-3-azetidinylacrylonitrile (molecular weight 228.2) by reacting 2-(4-ethoxyphenyl)-succinonitrile and azetidine with cupric acetate monohydrate as catalyst.

5 - (diethylamine)-3-(3-bromophenyl)-5-phenyl-3-pyrrolin-2-one (molecular weight 386.2) by reacting α-(3-bromophenyl)-β-benzoylpropionitrile and diethylamine with cupric bromate as catalyst.

5 - (azolidinyl) - 3 - (4 - butoxyphenyl) - 5 - phenyl-3-pyrrolin-2-one (molecular weight 376.4) by reacting α-(4-butoxyphenyl)-β-benzoylpropionitrile and azolidine with cupric acetate monohydrate as catalyst.

5 - piperidine - 3 - (3 - ethylphenyl) - 5 - phenyl - 3-pyrrolin-2-one (molecular weight 346.4) by reacting piperidine and α-(3-ethylphenyl)-β-benzoylpropionitrile with cuprous bromide as catalyst.

5-dimethylamino - 3 - phenyl-5-(4-methylphenyl)-3-pyrrolin-2-one (molecular weight 292.3) by reacting dimethylamine and α-phenyl-β-(4-methylbenzoyl)-propionitrile with cupric salicylate as catalyst.

Example 3

2,3-diphenylsuccinonitrile (23.2 g.) was added with stirring to a solution of cupric acetate monohydrate (1.0 g.) and piperidine (10 ml.) in 150 milliliters of dimethylsulfoxide. Following the addition of the 2,3-diphenylsuccinonitrile to the reaction mixture, stirring was continued and air bubbled through the mixture for a period of about 14 hours during which time the temperature of the reaction mixture remained at about room temperature. At the conclusion of the reaction period, the reaction mixture was diluted with 800 milliliters of water and the pH brought to about 1 by the addition of dilute hydrochloric acid. The acidic reaction mixture was then filtered to remove the desired solid 2,3-diphenyfumaronitrile product (melting point 161° to 162° C.). The fumaronitrile produce was obtained in a 97% yield.

The new 3-(amine substituted)-2-phenylacrylonitriles and 5-substituted derivatives of 3,5-diphenyl-3-pyrrolin-2-one compounds of the present invention are useful for the control and kill of various insects, bacteria, fungi, terrestrial plants and other pests such as snails, trash and fish. For such use, the unmodified compounds can be employed. Alternatively, the compound can be dispersed on an inert solid and the resulting product employed as the dust. In addition, the active compounds can be dispersed in water with or without the aid of a wetting agent, and the resulting aqueous dispersion employed as sprays, drenches or washes. In other procedures, the compound can be employed in oil or other solvents or as a constituent in solvent-in-water or water-in-solvent emulsions or as aqueous dispersions thereof which can be applied as a spray, drench or wash.

In representative operations, 5-(1-aziridinyl)-3,5-diphenyl-3-pyrrolin-2-one gives substantially complete kill and control of *Venturia inequalis* (causative agent of apple scab) when applied as the sole active agent in a spray and in an amount sufficient to provide 500 parts per million by weight of the spray composition.

In further operations, 3-(dimethylamino)-2-phenylacrylonitrile is added as the sole fungicidal and bactericidal constituent to nutrient agar in an amount sufficient to provide 500 parts per million by weight of the agar. The agar is then solidified, inoculated with an appropriate organism and incubated under optimum growth conditions. As a result of such operations, 3-(dimethylamino)-2-phenylacrylonitrile gives complete control and kill of *Staphylococcus aureus, Bacillus subtilis, Pullularia pullulans* and *Salmonella typhosa*.

In other operations, 3-(dimethylamino)-2-phenylacrylonitrile is employed as the sole active ingredient in a pre-emergent herbicide drench. The drench is added to the soil in an amount sufficient to provide 50 pounds per acre of the 3-(dimethylamino)-2-phenylacrylonitrile and the seeds planted in the treated soil. As a result of such operations, substantially complete kill of seeds of pigweed and bindweed are obtained.

In still further operations, α-phenyl-1-piperidineacrylonitrile gives substantially complete kill of ram's horn snails when added to their aqueous environment in an amount sufficient to provide 1000 parts per million by weight of the α-phenyl-1-piperidineacrylonitrile as the sole toxic constituent.

Substantially complete kill of the insect plum curculio is obtained when the insect is sprayed with a liquid spray containing 2500 parts per million by weight of either 5-piperidine-3,5-diphenyl-3-pyrrolin-2-one or α-phenyl - 1 - piperindineacrylonitrile as the sole toxic ingredient.

The starting materials employed in the present invention are known compounds and are produced in accordance with known synthesis procedures. In such known procedures, phenylacetonitrile derivatives corresponding to the formula

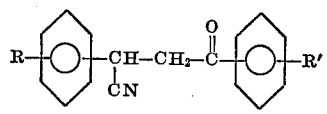

are prepared by condensing an R substituted benzaldehyde with an R′ substituted acetophenone. The resulting condensation product is treated with HCN to produce the nitrile derivative.

What is claimed is:

1. A 5-(amine substituted)-3,5-diphenyl-3-pyrrolin-2-one corresponding to the formula

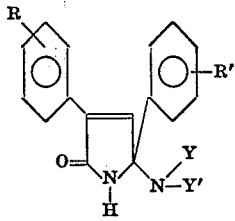

wherein R' represents methyl, halo, or nitro; R represents hydrogen, alkyl having 1 to 8 carbon atoms, phenyl, halo, cyano, nitro, lower alkoxy or lower thioalkyl; Y represents lower alkyl or lower hydroxyalkyl containing from 1 to 4 carbon atoms and Y' represents hydrogen, lower alkyl or lower alkanol and when Y and Y' are alkyl moieties they can be connected to form a saturated 3, 4, 5 or 6-membered heterocyclic ring with the amine nitrogen as the sole hetero-atom.

2. A compound claimed in claim 7 wherein the 5-(amine substituted)-3,5-diphenyl-3-pyrrolin-2-one is 5-(dimethylamino)-3,5-diphenyl-3-pyrrolin-2-one.

References Cited
UNITED STATES PATENTS
3,401,176  9/1968  Hofmann et al. ____ 260—326.5

JOSEPH A. NARCAVAGE, Primary Examiner